Nov. 5, 1968     J. RIX     3,409,284
ELASTIC HOLLOW SPRING BODIES
Filed May 4, 1966     2 Sheets-Sheet 1

Inventor:
Johannes Rix
By Michael S. Striker
Attorney

Nov. 5, 1968  J. RIX  3,409,284
ELASTIC HOLLOW SPRING BODIES
Filed May 4, 1966  2 Sheets-Sheet 2
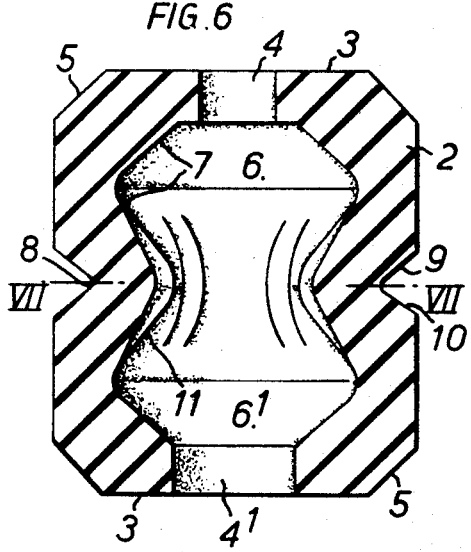
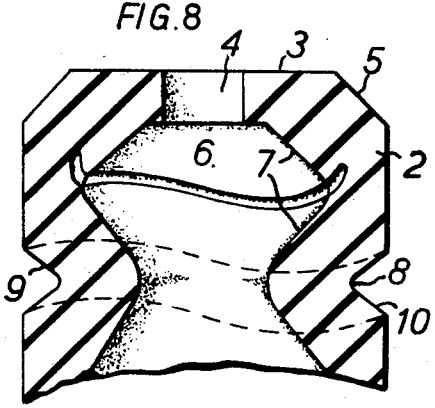
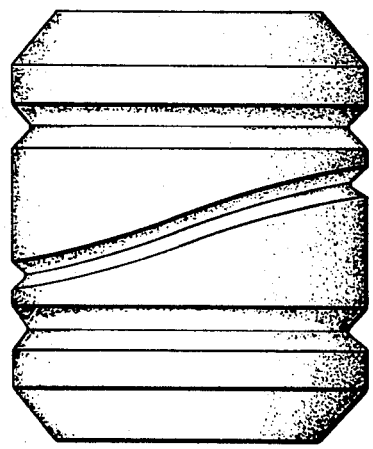
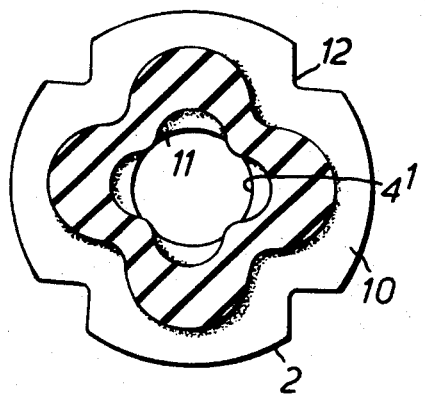
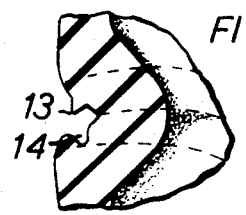
Inventor
Johannes Rix
by Michael S. Striker
Attorney United States Patent Office 3,409,284
Patented Nov. 5, 1968

3,409,284
ELASTIC HOLLOW SPRING BODIES
Johannes Rix, Kassel, Germany, assignor to Aeon Products (London) Limited, London, England
Filed May 4, 1966, Ser. No. 547,571
Claims priority, application Germany, May 15, 1965, R 40,648
18 Claims. (Cl. 267—1)

ABSTRACT OF THE DISCLOSURE

An elastic hollow elongated compression spring body consists of elastomeric material. The body has an outer circumferential surface and a pair of axial end faces at least one of which is provided with an aperture adapted to receive fastening means therein. The surface is provided with at least one circumferential groove bounded by two mutually inclined side wall surfaces which approach one another in response to axial compression of the body. The angle included between at least one of the side wall surfaces and the axis of the body is different at circumferentially spaced locations of the body. Thus, when the spring is axially compressed, engagement between the side wall surfaces will initially take place at only certain circumferentially spaced portions, and the remainder of side wall surfaces will take place subsequently on continued further axial compression of the body.

---

The invention relates to elastic hollow spring bodies of rubber or other elastomeric material, for absorbing shocks in vehicles. Elastic hollow spring bodies are known which are adapted for being loaded in the direction of their longitudinal axes, the bodies having a substantially slim cylindrical or slightly conical shape, and being provided at at least one end with bores to receive fastening members, while in the outer wall of the body constrictions are provided which adjoin cylindrical or slightly curved wall parts, inwardly directed thickenings of the walls being provided in the interior of the body which correspond to the constrictions, outwardly directed widened portions being formed in the interior of the body which correspond to the outer cylindrical, freely deformable portions of the walls and the deformation of which is influenced by the constrictions.

Spring bodies of this kind have been known for a long time and are used on a large scale particularly in the construction of motor vehicles. The widespread use of these spring bodies is due to a number of advantageous properties. With the aid of such spring bodies it is possible for shocks to be resiliently absorbed, and the bodies have a progressive deformation characteristic which enables very large and very small forces to be effectively absorbed without the bodies being compressed fully solid even under great forces. When used without other springs, their progressive characteristic enables the frequency of oscillation in the various load ranges, that is to say when the vehicle is empty, partly occupied, and fully occupied, to be kept substantially constant, which has an advantageous effect on the comfort of the occupants. The deformability of the spring body is favourable, so that a long spring deflection path in relation to the unloaded structural height can be achieved. Because of the favourable deformability resulting in particular from the constrictions, the increase in diameter on deformation can be kept within reasonable limits, which is advantageous in respect of installation, particularly having regard to the restricted space available near the chassis in motor vehicle construction. It is true that on inward deflection the wall portions of the constriction grooves come increasingly into contact with one another and thus ultimately bear against one another, the base for the individual spring body being thereby enlarged to a certain extent. A certain lateral stability is thus provided. In the case of high degrees of slimness, that is to say in the case of spring bodies having a diameter which is small in relation to the structural height, so that a long spring path can be expected of them, this supporting of the wall portions of the constriction grooves against one another and thus a widening of the base through the enlargement of the cross-sectional area subjected to compressive stresses occur during normal operation only to a slight extent. The lateral stability achieved with such spring bodies is therefore poor. This danger of deficient lateral stability and therefore of lateral buckling of the spring body is particularly great when the force acting on the spring body is guided in an angular movement or the force occurs periodically in different directions at an angle to the support surface.

It is an object of the invention to obviate the disadvantages of the known spring bodies and in particular to improve lateral stability while at the same time retaining or even improving their favourable properties. Another object of the invention is to increase the loadability of the spring body and at the same time to obtain a spring characteristic such that the initial characteristics is flat, that is to say that the spring comes into action without any marked shock or transition. In addition, even with the longest spring path, the spring preferably should show only a slight increase in diameter, in order that installation may be possible under the restricted space conditions existing particularly in vehicle construction. It should also be possible to achieve great damping despite the great elasticity required, in order that the oscillations brought about may die down very quickly. In the practical realisation of a number of different aims of the invention, some of which are diametrally opposed to one another, it should not be overlooked that the spring body should be able to be installed easily and with simple means in order to permit versatile and widespread use in vehicle construction, and that it should be able to be manufactured simply and cheaply if it is to be widely used at all in vehicle construction. This means above all the elimination of metal parts which need to be secured by vulcanisation and which would necessitate an expensive mould, additional parts, and expensive production of metal components. It should therefore be possible for the spring body to be produced in one piece from rubber or other elastomeric material in one "moulding," the shape of the spring body being so selected that such one-piece manufacture is possible in an economical manner.

In the case of a hollow spring body according to the invention, of rubber or other elastomeric material, having a substantially slim shape and provided at at least one end with bores to receive fastening elements, the above-mentioned requirements can be achieved through suitable formation of the constriction groove or grooves and the formation of the internal hollow space. In the hollow spring bodies according to the invention the constriction grooves are made with sharp edges and adjoin external cylindrical wall portions which in their deformation and enlargement of diameter are influenced by the constriction zone or constriction grooves. Bead-shaped thickenings extending in the radial direction lie opposite said constrictions in the interior of the hollow body. Adjoining these internal thickenings, and lying opposite the external, approximately cylindrical wall portions, the interior of the hollow body contains hollow spaces which are formed approximately in the shape of double cones and the walls of which increasingly make contact with one another with increasing load, while the constriction groove or grooves acts or act like a rubber joint and under the load the wall portions of the groove or grooves likewise move towards one another, make contact with one another, and begin to roll one on the other. It is with the shaping of these wall portions which co-operate with one another that the invention is principally concerned. The underlying principle in this respect is not merely to obtain the greatest possible deformation over the entire structural length of the hollow spring body, by dividing the outer and inner walls, but to also achieve resiliency in the axial direction when the wall portions of the grooves and hollow spaces lie one on the other, that is to say in other words to obtain additionally an increased spring path when these wall parts lie against one another. The spring path is generally terminated when the wall parts lie completely against one another. A favourable spring characteristic which is desirable, particularly in vehicle construction, namely with a flat initial portion and gradually increasing progressively to a hardening, that is to say a vigorous progression, is achieved when such wall parts lie one against the other. The wall parts lying against one another also additionally enlarge the support base and the cross-sectional surface of the spring body, so that soft springing and great stability can be achieved. Moreover, the fact that in the longitudinal direction of the hollow spring body areas directed angularly oppositely to one another can lie one against the other in the form of a joint, has the effect of keeping the increase in diameter small. With the smallest possible increase in diameter this can be achieved by making the constriction grooves on the outside and in addition the surfaces of the cavity on the inside, "resilient" in themselves. The outer constriction groove or grooves is or are rectilinear or bent at a sharp angle in axial section, but the wall surfaces of this constriction groove or grooves are so constructed that, measured over the periphery of the spring body, they form different angles in relation to the axis, that is to say the two surfaces bounding the constriction groove or grooves are in this case given an undulating or zig-zag form. In the inward deflection operation, that is to say when the wall surfaces approach one another, these undulations can for example in each case first come into contact with one another by the crests of their undulations, while between the troughs of their undulations there is still a space for further inward deflection in the vertical direction without the neighbouring wall portions being caused to bulge out or increase the diameter of the spring body. It is also possible for example for the bottom wall surface of a groove to be given a different undulating shape from the upper wall surface, so that until they lie against one another additional deformation and therefore springing is still possible. Another possibility comprises offsetting the undulation troughs in relation to the undulation crests by a certain amount, so that when they come into contact a component is produced in the peripheral direction which attempts to introduce a corresponding wave crest into a wave trough. It will be appreciated that through this arrangement not only is the spring constant influenced in the direction of soft initial springing, which can thus commence without shocks, but that the increase in diameter is also kept small to an extent which could not hitherto be achieved, owing to the fact that the wall portions adjoining the constriction troughs start to bulge out to a greater extent only when the springing and deformation properties in the constriction grooves have been utilised.

Instead of undulating wall portions, an arrangement is also possible in which the wall surfaces of the grooves have a zig-zag or serrated form.

The bottom of the constriction groove or grooves may in a known manner be circular, that is to say a section through a hollow spring body according to the invention would exhibit a circular annular surface in the plane of the constriction groove. In order to increase still further the deformability of the hollow spring body, the bottom of the constriction groove or grooves may also have an undulating or zig-zag shape. The advantage is thereby gained that having regard to the tendency towards an increase in diameter resulting from compressive loading in the bottom of the groove, very great resiliency in the radial direction is here achieved, which consists not only of the actual deformability of the material but also of the possibility of the stretching of the undulations in the bottom of the groove. Viewed in cross-section the bead-shaped formation of the inner cross-section of the hollow spring body may also have an undulating or zig-zag shape. This provides the advantage that under the compressive loading of the entire spring body, during which in the inner cross-section a radial compression of the material in the inward direction may occur, crushing folds will here be avoided which, as is well known, lead to premature destruction of the material precisely in the case of spring bodies.

It is obvious that in order to promote these efforts to obtain the greatest possible deformation of the spring body over the entire cross-section, the inner wall portions which form the wall surfaces of the double cones may also be shaped in accordance with the constriction grooves.

Through the fitting into one another of undulation troughs and undulation crests or teeth with corresponding gaps on the wall portions of the constriction groove or on the inner wall portions of the hollow spaces shaped as duble cones, stability in respect of the buckling of the spring is achieved, which cannot be obtained if the supporting surfaces lying against one another and rolling over one another are made smooth. Through this constriction a firm locking of the wall portions is achieved. Another step for increasing the stability of the spring body in respect of lateral buckling consists in disposing the bottom wall surface of the constriction grooves so that in cross-section the said bottom wall surface lies asymmetrically in relation to the upper wall surface of the groove, for example, that is to say the constriction grooves are disposed in an undercut arrangement. When the spring deflects inwardly and the wall portions lie against one another, the upper wall surface of the groove is limited in its expansion by the bottom wall surface. When these wall surfaces have an undulated or serrated form in relation to one another, firm locking will occur.

Finally, the co-operating surfaces may be provided with helical depressions or projections which, as the inward deflection of the spring body progresses and the diameter of the wall parts increases, engage in one another and thus provide a firm union.

In order to improve still further the deformability over the entire cross-section, the bead-shaped cross-section or the bead-shaped cross-sections in the interior of the hollow body and also the external, substantially cylindrical wall portions which adjoin the constriction grooves may be provided with substantially vertical grooves which on the inward deflection of the spring open under compressive stressing and thus provide further deformability.

The grooves may, however, also be so shaped that they extend, for example, in helical lines from one constriction plane to the other. Depending on the inclination of these grooves in relation to the direction of compressive loading, the component which effects the radial opening of the grooves or brings the walls of the grooves against each other will come into action. In every case through the primary utilisation of these possibilities of deformation the neighbouring wall portions are influenced so that the outward bulging of these wall portions remains within acceptable limits.

In addition to good utilisation of the deformation and therefore of the high loadability and a long spring path together with good lateral stability, another advantage achieved is good damping. With all spring bodies which are very easily deformed, damping is normally very poor. It is true that the deformability of the rubber hollow bodies according to the invention is very favourable, but those measures which result in a favourable deformation characteristic, namely the bringing into contact of surface parts which move towards and are supported against one another, can be utilised for the purpose of improving damping. This improved damping is achieved through the following measures: surfaces which under compressive loading of the hollow spring body come to lie against one another are "cold welded." Through adhesion they "stick" to one another. When relieved of load, they require a certain force in order to be pulled apart. The restoring force of the spring is reduced by the expenditure of force so that a damping action is achieved. The other measure is that the design of the surfaces which come to lie against one another is such that in consequence of the different angles, of the arrangement in helical lines, and of the undercut arrangement, "undercut" surface parts, which under compressive loading expand perpendicularly to the direction of loading, are always limited or constricted in their expansion by surface parts lying in front of them. On the load relieving path, however, every elastic part still has at that point of the spring path a greater diameter than at the corresponding part during the loading movement, in consequence of hysteresis. During load relieving the enlarged surface part therefore jams against the surface portion lying in front of it, in consequence of the diameter which is still too large for "free movement." The expenditure of force required to overcome this jamming must be supplied by the restoring force of the spring, and has a damping effect.

For the purpose of forming the bottom of the constriction groove or of the constriction cross-section, an elastic ring may be embedded in the wall portion in the plane of the groove and in order to increase elasticity may be of spatially undulating configuration.

In order to make the invention clearly understood reference will now be made to the accompanying drawings which are given by way of example and in which:

FIG. 6 is a sectional view showing a form of construction of a hollow spring body in which the bottom of the constriction groove has undulating depressions, and showing an undulating formation of a bead-shaped thickening in the interior of the hollow spring body;

FIG. 7 is a sectional view through the spring body of FIG. 6 on the line VII—VII, in the plane of the constriction groove, from which the non-circular cross-sectional shape of the constriction can be seen, vertically extending constriction grooves also being illustrated in this section;

FIG. 8 is a fragmentary sectional view of a spring body in which the inner hollow space is provided with constriction grooves influencing deformation and damping;

FIG. 9 is an elevation view of a spring body having two constriction planes and a groove disposed diagonally and extending between said two planes; and FIG. 10 is a fragmentary sectional view of a spring body having constriction groove in which projections or depressions are provided in the wall portions of the groove and are inserted one in the other when the walls lie against one another.

Figure 1:
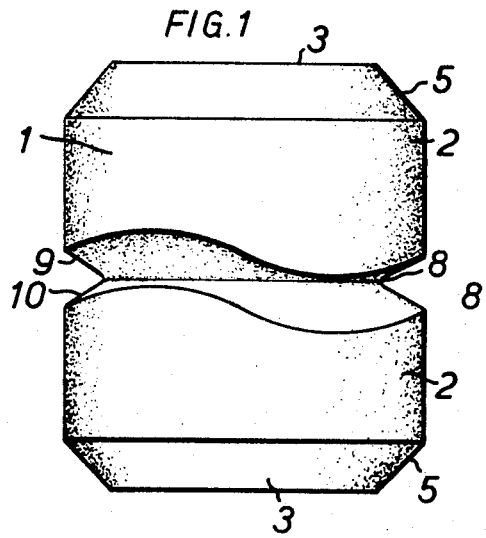
FIG. 1 is an elevation view of a spring body according to the invention, having an undulating conformation of its constriction groove, the plane at the bottom of the groove extending perpendicularly to the axial direction.

In the drawings, 1 designates a rubber spring body having substantially cylindrical outer wall portions 2, with end faces 3 which extend substantially transversely of the axial direction. A fastening bore, 4, 4' is formed in the end faces or at least in one end face. The transition from the end faces 3 to the outer wall portions is advantageously in the form of a conical wall 5, in order to obtain better initiation of forces and to reduce bulging. The inner hollow space or hollow spaces 6, 6' is or are formed as double cones in the region of the outer cylindrical wall portions, in such a manner that under load the conical wall surfaces bear increasingly against one another. The outer wall portions are interrupted by one or more constrictions 8 which have a substantially V-shaped cross-section and extend around the outer periphery of the hollow body.

Figure 2:
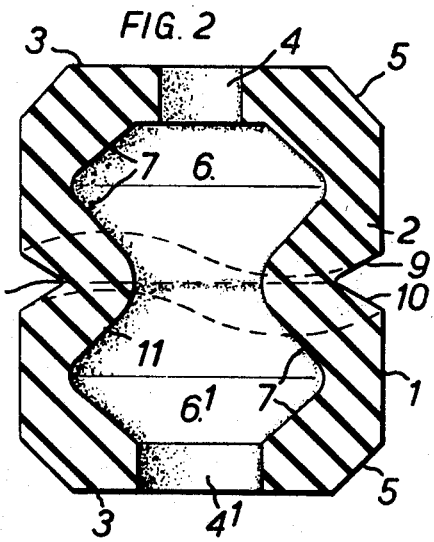
FIG. 2 is a vertical sectional view through the spring body of FIG. 1.

In FIGS. 1 and 2 this constriction groove 8 is shown as a V-shaped groove having a cross-section bounded by straight lines. The bottom of the groove 8 extends parallel to the two ends faces 3, while the side flanks 9 and 10, in the case of FIGS. 1 and 2, form together the same opening angle over the entire periphery, while the angle of the surfaces 9 and 10 in relation to the axis of the spring body varies. A groove is thus formed which extends in undulating form around the periphery. Favourable deformation with a stabilizing action is thus achieved under load. Opposite the constriction plane, in the inner hollow space of the spring body, there is provided a corresponding bead-shaped thickening 11, which in FIGS. 1 and 2 extends parallel to the rounded bottom of the constriction groove.

Figure 3:
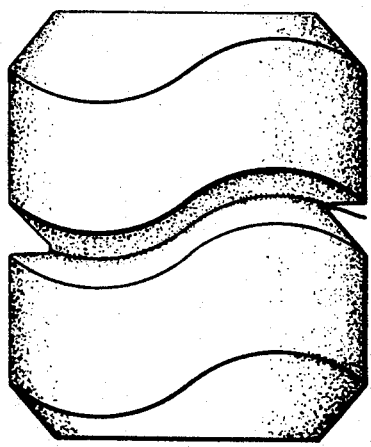
FIG. 3 is an elevation view of a spring body having a different formation of the constriction groove and of the outer walls, the plane passing through the bottom of the constriction groove having an undulating conformation, the cylindrical wall portions adjoining the constriction groove extending to such heights that their end contours are parallel to the constriction groove.

In the embodiment of FIG. 3 the constriction groove 8 is disposed in undulating form over the periphery both at the bottom and at the flanks 9 and 10. The constriction groove is adjoined on both sides by external cylindrical wall portions 2 which have the same axial length and the transition of which to the conical portion 5 extends parallel to the constriction groove. In the inner hollow spaces 6, 6' the bead 11 and the maximum diameter region of the hollow spaces shaped as double cones also extend correspondingly.

Figure 4:
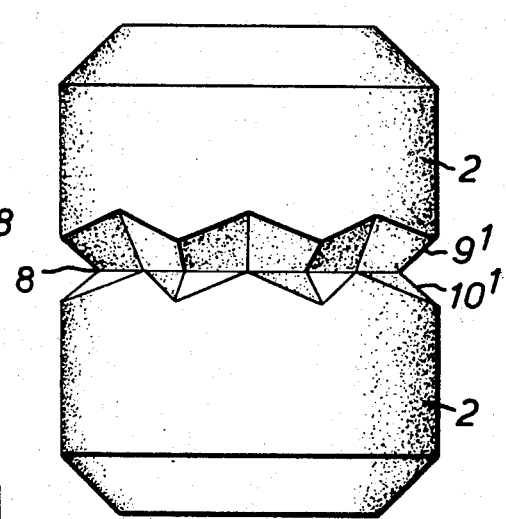
FIG. 4 is an elevation view of a spring body having a zig-zag constriction groove, in which the undulation crests are offset in relation to the undulation troughs.

In the embodiment of FIG. 4 the flanks 9' and 10' of the groove 8, the bottom of which lies parallel to the end faces 3, have a zig-zag form. The projections and indentations on the flank 9' are slightly offset in the direction of the periphery in relation to the oppositely situated projection and indentations on the flank 10'. On the inward deflection of the hollow spring body and when the flanks 9' and 10' of the constriction groove bear against one another, firm locking is thereby achieved.

Figure 5:
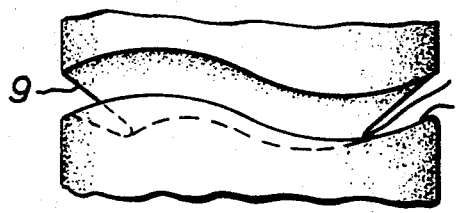
FIG. 5 is a fragmentary elevation view showing a form of construction in an undercut constriction groove.

The embodiment of FIG. 5 is similar to that of FIGS. 1 and 2 or FIG. 3, but the constriction groove is undercut.

The embodiment of FIGS. 6 and 7 is similar to that of FIGS. 1 and 2, but the bottom of the constriction groove 8 has undulating depressions, the bead-shaped thickening having a corresponding undulation visible clearly in FIG. 7. The undulating depressions of the bottom of the groove 8 enable the groove 8 to have a substantially constant depth, despite the provision of axially extending constriction grooves 12 in the rubber body.

The embodiment of FIG. 8 is similar to that of FIGS. 1 and 2, but shows the provision of a constriction groove at the interior of the body, for influencing deformation and damping characteristics.

The embodiment of FIG. 9 has two constriction planes provided by two spaced-apart constriction grooves, a further constriction groove being provided, which is disposed at an inclination so as to extend substantially between the two constriction planes.

The embodiment of FIG. 10 has a constriction groove provided with propections 13 at one groove wall and depressions 14 at the opposite groove wall, the projections 13 engaging in the depressions 14 when the groove walls lie against one another.

I claim:
1. An elastic hollow elongated spring body of elastomeric material, said body having an outer circumferential surface and a pair of axial end faces at least one of which is provided with an aperture adapted to receive fastening means therein, said surface being provided with at least one circumferential groove bounded by two mutually inclined side wall surfaces which approach one another in response to axial compression of the body, and the angle included between at least one of said side wall surfaces and the axis of said body being different at circumferentially spaced locations of said body whereby, when said spring is subjected to axial compression, engagement of said side wall surfaces will initially take place between circumferentially spaced portions of the same and engagement of the remainder of said side wall surfaces will take place subsequently on continued axial compression of said body whereby the compression characteristic of said spring is enhanced.

2. An elastic hollow spring body as claimed in claim 1, wherein the wall surfaces of said groove have an undulating form.

3. An elastic hollow spring body as claimed in claim 1, wherein the wall surfaces of said groove have a zig-zag form.

4. An elastic hollow spring body as claimed in claim 2, wherein the wall surfaces of said groove extend in the form of shouldered steps.

5. An elastic hollow spring body as claimed in claim 2, wherein the cresta and troughs of the groove undulations defined by said side wall surfaces of said groove lie opposite one another.

6. An elastic hollow spring body as claimed in claim 5, wherein said crests and troughs are adapted to matingly fit into one another.

7. An elastic hollow spring body as claimed in claim 2, wherein crests and troughs of the groove undulations defined by one side wall surface are offset less than one undulation length in the circumferential direction in relation to the crests and troughs of the other side wall surface of the groove.

8. An elastic hollow spring body as claimed in claim 1, wherein one of said side wall surfaces of said groove is undercut in relation to the other.

9. An elastic hollow spring body as claimed in claim 1, wherein on one of said side wall surfaces of said groove continuous projections are provided which engage in corresponding depressions in the opposite side wall surface.

10. An elastic hollow spring body as claimed in claim 9, wherein said continuous projections and depressions are in the form of a helical rib and channel.

11. An elastic hollow spring body as claimed in claim 1, wherein the inner wall faces of the body are so shaped as to move towards one another asymptotically on inward deflection of the body and are provided with projections and depressions adapted to engage in one another upon a predetermined degree of axial compression of the body.

12. An elastic hollow spring body as claimed in claim 1, wherein the inner wall faces of the body are so shaped to define a bead-like inwardly directed radial thickening in the plane of the groove.

13. An elastic hollow spring body as claimed in claim 12, wherein the bead-like thickening, in the cross-section of said plane, is bounded by undulating lines.

14. An elastic hollow spring body as claimed in claim 1, further comprising an elastic ring embedded in the body in the region of the groove.

15. An elastic body as claimed in claim 1, wherein at least circumferentially extending portions of said groove are inclined longitudinally of said body with reference to the axis of the same.

16. An elastic spring body as claimed in claim 13, wherein said undulating lines are zig-zag lines.

17. An elastic spring body as claimed in claim 1, and further comprising substantially axially extending groove means provided in portions of said circumferential surface which adjoin said circumferential groove.

18. An elastic spring body as claimed in claim 1, said circumferential surface comprising respective surface portions which adjoin said circumferential groove; and further comprising at least one additional circumferential groove provided in each of said surface portions and extending obliquely with reference to the axis of said body.

References Cited
UNITED STATES PATENTS

| | | | |
|---|---|---|---|
| 2,822,165 | 2/1958 | Boschi | 267—63 X |
| 3,037,764 | 6/1962 | Paulsen | 267—63 |
| 3,144,247 | 8/1964 | Szonn et al. | 267—1 X |

DUANE A. REGER, *Primary Examiner.*